C. McCAULEY.
EVAPORATING-PANS.

No. 195,517.  Patented Sept. 25, 1877.

Witnesses.
J. C. Hubbell
T. J. Roach

Inventor.
Charles McCauley
By H. N. Jenkins
ATTORNEY.

UNITED STATES PATENT OFFICE.

CHARLES McCAULEY, OF NEW ORLEANS, LOUISIANA, ASSIGNOR OF ONE-HALF HIS RIGHT TO JOHN THOMPSON, OF SAME PLACE.

IMPROVEMENT IN EVAPORATING-PANS.

Specification forming part of Letters Patent No. 195,517, dated September 25, 1877; application filed May 21, 1877.

*To all whom it may concern:*

Be it known that I, CHARLES MCCAULEY, a resident of the city of New Orleans, parish of Orleans and State of Louisiana, have invented a certain new and useful Improvement in Evaporating-Pans; and I do hereby declare the following to be a full, clear, and correct description of the same, reference being had to the annexed drawing, making a part of this specification.

This invention consists in a new and improved mode of arranging the internal pipes of evaporating-pans or clarifiers so as to admit of their being removed with the greatest facility and dispatch whenever it is necessary to clean or repair the same.

Figure 1:
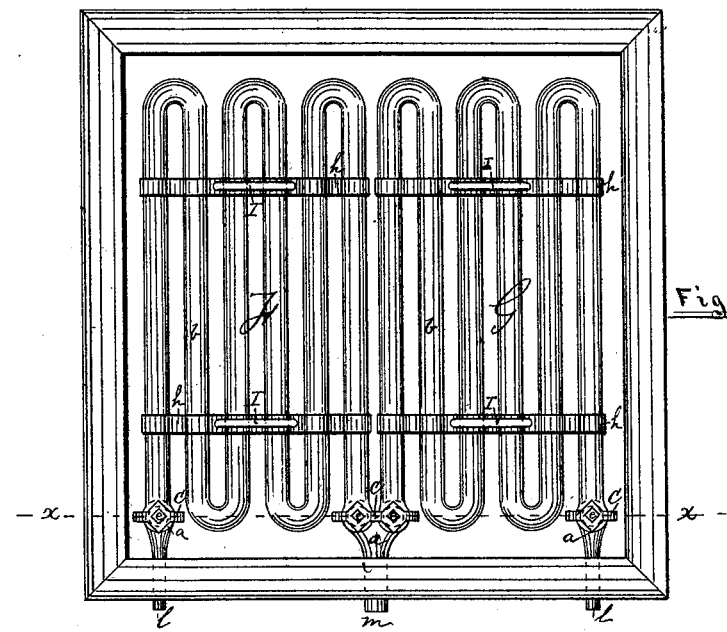
Figure 2:
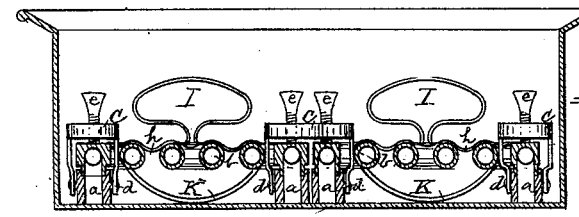

On the accompanying drawing, Figure 1 represents a view of an ordinary evaporating-pan furnished with my improvements, and Fig. 2 a sectional view through the line $x\ x$ thereof.

My invention consists in providing the pans with two or more pipe-seats, $a$, the tops of which are perforated to afford communication, through corresponding openings in the ends of the pipes $b$, with the interior of the same.

C are metal arches, the lower ends of which are pivoted, as at $d$, to the sides of the pipe-seats, in such a manner that they can be swung over the said seats, and made, by means of screws $e$, to hold the pipes $b$ closely thereupon, and hence form a tight joint, which is easily broken, when the pipes are to be removed, by loosening the aforesaid screws and by swinging the arches back against the sides of the pan.

For convenience in handling, the pipes are made in sections, as at F G, and the coils of each section stiffened by bands or ties $h$, the upper sides of which are furnished with handles I, and the under sides with supporting-legs K, the latter about equal in height to the seats $a$, in order that the sections may rest in a horizontal position.

The outside connections are made with, and steam supplied to, the interior pipes through short projecting pipes, $l$, which connect with the seats, as shown in Fig. 1. For the exit of the steam but one pipe, $m$, is employed, it being of a larger diameter than the inlet-pipe, and made to connect with the inner or central seats, as shown.

Having described my invention, what I claim as new, and desire to secure by Letters Patent, is—

1. In an evaporating-pan, two or more pipe-seats, $a$, provided with metal arches C, the latter furnished with screws $e$ for securing the pipes on their seats, as described, and for the purpose set forth.

2. The pipe-sections F G, provided with legs K and handles I, in combination with an evaporating-pan furnished with pipe-seats $a$ and arches C, as described, and for the purpose specified.

In testimony whereof I have hereunto signed my name.

CHARLES McCAULEY.

In presence of—
J. C. HUBBELL,
S. L. JORDAN.